(12) United States Patent
Nobuoka

(10) Patent No.: US 8,723,967 B2
(45) Date of Patent: May 13, 2014

(54) IMAGE PROCESSING APPARATUS, IMAGE PICKUP APPARATUS, AND IMAGE PROCESSING METHOD FOR PERFORMING CUT-OUT PROCESSING FOR AN IMAGE FOR ELECTRONIC IMAGE-STABILIZATION

(75) Inventor: Kosuke Nobuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 818 days.

(21) Appl. No.: 12/147,207

(22) Filed: Jun. 26, 2008

(65) Prior Publication Data

US 2009/0002499 A1 Jan. 1, 2009

(30) Foreign Application Priority Data

Jun. 29, 2007 (JP) ................................. 2007-172745

(51) Int. Cl.
*H04N 5/228* (2006.01)
(52) U.S. Cl.
USPC .................................. 348/208.6; 348/208.14
(58) Field of Classification Search
USPC ....................... 348/208.2, 208.1, 208.4, 208.6
See application file for complete search history.

(56) References Cited

U.S. PATENT DOCUMENTS

| | | | | |
|---|---|---|---|---|
| 7,218,675 B1 * | 5/2007 | Takahashi | ................. | 375/240.16 |
| 7,502,050 B2 * | 3/2009 | Hatanaka et al. | .......... | 348/208.3 |
| 7,705,884 B2 * | 4/2010 | Pinto et al. | ................ | 348/208.99 |
| 7,782,362 B2 * | 8/2010 | Oshima | ........................ | 348/208.6 |
| 7,800,652 B2 * | 9/2010 | Tang et al. | .................. | 348/208.6 |
| 8,063,938 B2 * | 11/2011 | Ueki | .......................... | 348/208.16 |
| 8,134,604 B2 * | 3/2012 | Fujita et al. | ................. | 348/208.6 |
| 2005/0052539 A1 * | 3/2005 | Stavely et al. | ............. | 348/211.4 |
| 2006/0066744 A1 * | 3/2006 | Stavely et al. | ................. | 348/352 |
| 2008/0111889 A1 * | 5/2008 | Fujita et al. | ................. | 348/208.5 |
| 2011/0141219 A1 * | 6/2011 | Yeh | ............................ | 348/14.02 |
| 2012/0127329 A1 * | 5/2012 | Voss et al. | ................... | 348/208.4 |

FOREIGN PATENT DOCUMENTS

| | | | |
|---|---|---|---|
| JP | 2002-148670 | A | 5/2002 |
| JP | 2004-229002 | A | 8/2004 |
| JP | 2005-286940 | A | 10/2005 |
| JP | 2005-318515 | A | 11/2005 |
| JP | 2006-145629 | A | 6/2006 |
| JP | 2007-150601 | A | 6/2007 |
| JP | 2007-150601 | A | 6/2007 |
| JP | 2007-166269 | A | 6/2007 |

* cited by examiner

*Primary Examiner* — Ngoc-Yen Vu
(74) *Attorney, Agent, or Firm* — Canon USA, Inc., IP Division

(57) ABSTRACT

An image pickup apparatus having a function of performing cut-out processing for an image for electronic image-stabilization and detecting a particular object of the image is provided. The image pickup apparatus detects a particular object from an image that has not been subjected to cut-out processing for electronic image-stabilization, adjusts position information of the detected object in accordance with a cut-out position of the image for electronic image-stabilization, and combining an indication indicating the position of the particular object with a display image based on positional information after the adjustment is performed.

5 Claims, 6 Drawing Sheets

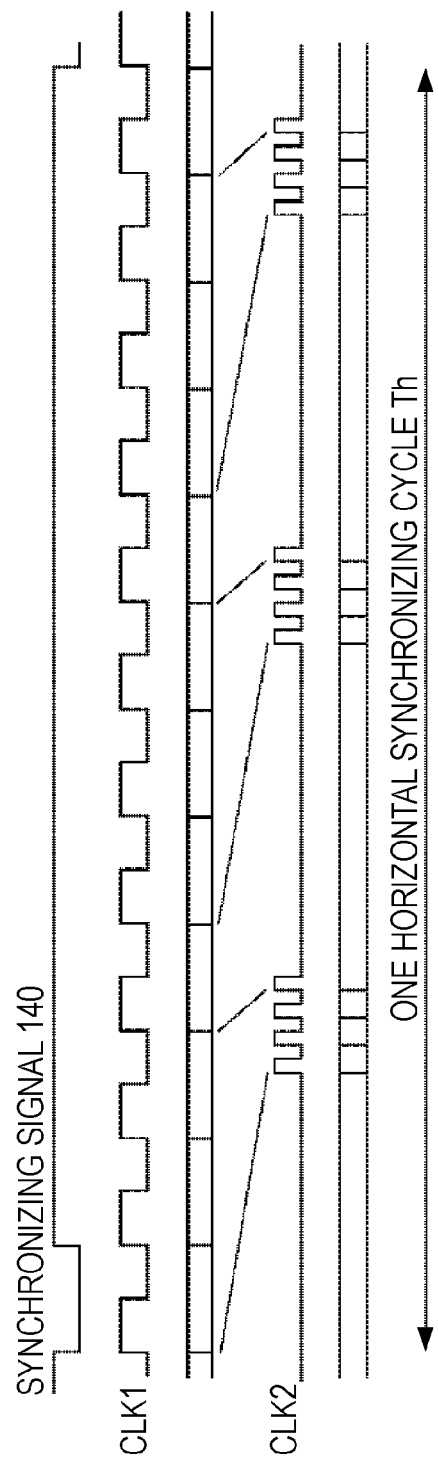

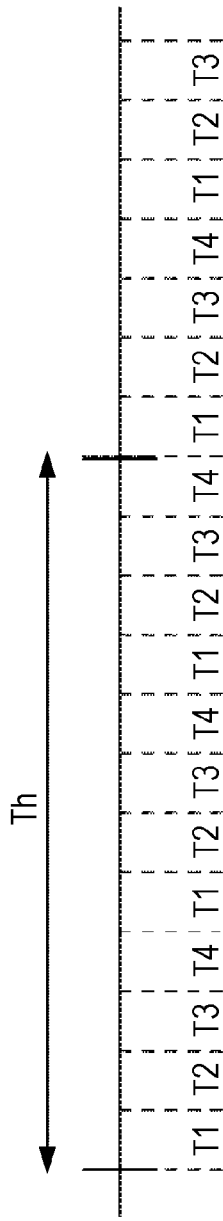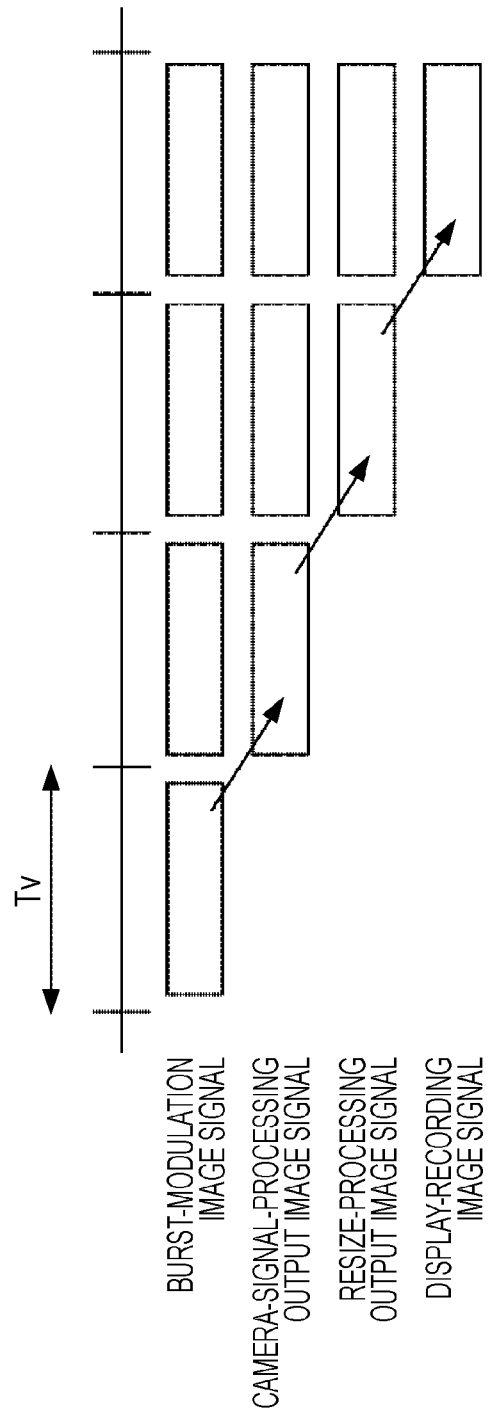

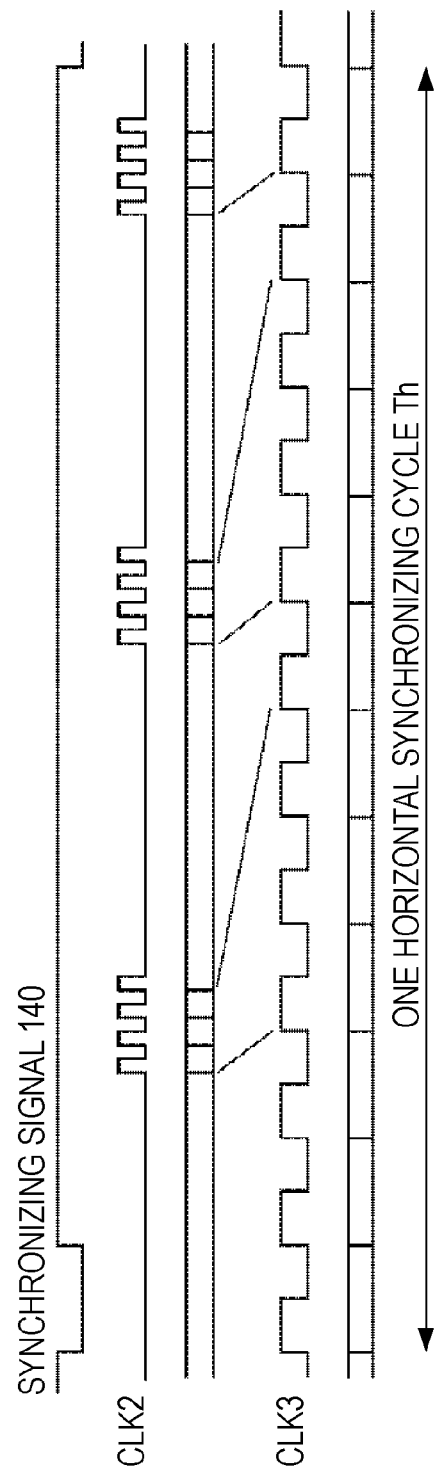

IMAGE PROCESSING APPARATUS, IMAGE PICKUP APPARATUS, AND IMAGE PROCESSING METHOD FOR PERFORMING CUT-OUT PROCESSING FOR AN IMAGE FOR ELECTRONIC IMAGE-STABILIZATION

BACKGROUND OF THE INVENTION

1. Field of the Invention

The present invention relates to image processing for displaying an indication indicating the position of an object detected from an image such that the indication is superimposed on the image.

2. Description of the Related Art

In recent years, digital cameras are capable of detecting the position and size of a particular object, such as the face of a human being, in an image in accordance with an image recognition algorithm have been developed. A technique for performing automatic focus control and exposure control by increasing the weighting on an evaluation value obtained from an area containing a particular object is disclosed, for example, in Japanese Patent Laid-Open No. 2006-145629.

In this case, information indicating the position of the particular object (for example, a frame enclosing the face of a human being) is displayed so as to be superimposed on a display image displayed on a display unit, such as a liquid crystal display (LCD), provided on the back side of a digital camera. The information indicating the position of the particular object is added to an image signal to be displayed on the display unit and is not added to an image signal of a static image to be recorded in a recording medium.

Video cameras having an electronic image-stabilization function of detecting, in accordance with an output of an acceleration sensor or a motion vector component obtained by image processing, an image shake component generated in a shooting operation and performing correction processing for canceling out the detected image shake component are available. More specifically, as disclosed in Japanese Patent Laid-Open No. 2002-148670, an image output from an image pickup element is temporarily recorded in a frame memory, a cut-out position is set so as to compensate for an image shake component, and cut-out processing is performed on the image in accordance with the set cut-out position.

For cameras not provided with such an electronic image-stabilizer, in a case where a cut-out position is not designated, the center position of the field angle of a display image displayed on a display unit often corresponds to the center position of the field angle of an image output from an image pickup element. However, for video cameras provided with such an electronic image-stabilization function, due to an operation of the electronic image-stabilization function, the center position of the field angle of a display image displayed on a display unit often does not correspond to the center position of the field angle of an image output from an image pickup element.

Under such circumstances, in order to apply a technique for detecting, in accordance with an image recognition algorithm, the position and size of a particular object, such as the face of a human being, in an image of a video camera provided with such an electronic image-stabilization function, it is important to take into account for a cut-out position.

In the case that a particular object is not a stationary body but a moving body, such as a human being or an animal, an increase in the time for detecting the position of the particular object causes a difference between the detected position and an actual position where the particular object is actually located. Thus, it is desirable to reduce the time required for obtaining a detection result of the position of the particular object as much as possible. In addition, it is necessary to start detection processing for the particular object as soon as possible once an image signal is obtained. To this end, it is desirable to detect the position of the particular object from an image that has not been subjected to electronic image-stabilization rather than from an image that has been subjected to electronic image-stabilization.

However, it is assumed that the position of the particular object that is located at the center of the field angle may be slightly shifted to the right of the field angle due to cut-out processing for the image being performed by the electronic image-stabilization. In this state, in the case that the position of the particular object is detected from an image that has not been subjected to electronic image-stabilization, the detected position of the particular object does not correspond to the position of the particular object in the displayed image that has been subjected to electronic image-stabilization.

That is, as a result of electronic image-stabilization, an indication indicating the detected position of an object may be displayed so as to be shifted from the position of the object in a displayed image that has been subjected to electronic image-stabilization.

SUMMARY OF THE INVENTION

The present invention is directed to an image processing apparatus.

According to an aspect of the present invention, an image processing apparatus includes a generation unit configured to perform cut-out processing for an image to generate a display image; a detection unit configured to detect an area of the image that has not been subjected to the cut-out processing by the generation unit, the area containing an object satisfying a set condition, and to generate information on a position of the detected area; and a combining unit configured to adjust the information on the position of the detected area in accordance with a cut-out position of the image where the cut-out processing is performed by the generation unit, and to combine an indication indicating a position of the object with the display image based on the information on the position of the detected area after the adjustment is performed.

According to another aspect of the present invention, an image pickup apparatus includes an image pickup element; a shake detection unit configured to detect a shake; a generation unit configured to perform cut-out processing for an image in accordance with a detection result obtained by the shake detection unit to generate a display image; a detection unit configured to detect an area of the image that has not been subjected to the cut-out processing by the generation unit, the area containing an object satisfying a set condition, and to generate information on a position of the detected area; an image pickup control unit configured to perform at least one of automatic focus control and exposure control by using the information on the position of the area detected by the detection unit; and a combining unit configured to adjust the information on the position of the detected area in accordance with a cut-out position of the image where the cut-out processing is performed by the generation unit, and to combine an indication indicating a position of the object with the display image based on the information on the position of the detected area after the adjustment is performed.

According to another aspect of the present invention, a method for image processing includes performing cut-out processing for an image to generate a display image; detecting an area of the image that has not been subjected to the cut-out processing, the area containing an object satisfying a set condition, and generating information on a position of the detected area; and adjusting the information on the position of the detected area in accordance with a cut-out position of the image where the cut-out processing is performed, and combining an indication indicating a position of the object with the display image based on the information on the position of the detected area after the adjustment is performed.

Further features and aspects of the present invention will become apparent from the following description of exemplary embodiments with reference to the attached drawings.

BRIEF DESCRIPTION OF THE DRAWINGS

FIG. 2 is a timing chart for explaining burst modulation of an image signal used in a first or second embodiment of the present invention.

FIGS. 3A and 3B are timing charts for explaining a method for intervening in access to a DRAM according to the first or second embodiment of the present invention.

FIG. 4 is a timing chart for explaining burst demodulation of an image signal used in the first or second embodiment of the present invention.

DESCRIPTION OF THE EMBODIMENTS

Various exemplary embodiments, features, and aspects of the invention will be described in detail below with reference to the drawings.

First Embodiment

Figure 1:
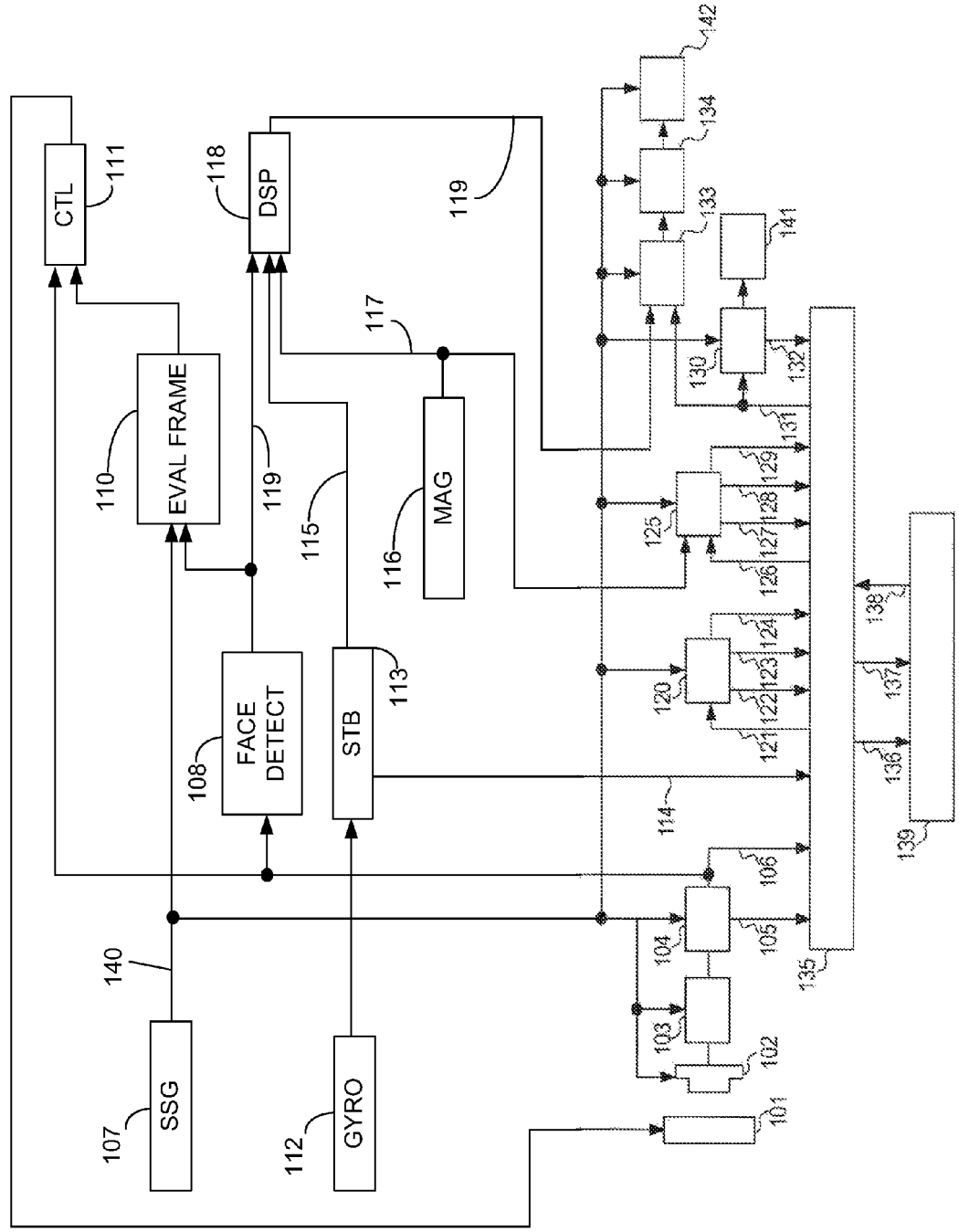
FIG. 1 is a block diagram showing the entire configuration of an image pickup apparatus according to a first embodiment of the present invention.

FIG. 1 is a block diagram of an image pickup apparatus according to a first embodiment of the present invention.

In this embodiment, the image pickup apparatus is, for example, a video camera having an electronic image-stabilization function. However, an aspect of the present invention can be applied to a digital camera having a function of capturing moving images and an electronic image-stabilization function.

Referring to FIG. 1, an imaging optical system 101 includes a focus lens, and an image sensor 102 converts light flux passing through and being transmitted from the imaging optical system 101 into an image signal serving as an electric signal. A burst modulation circuit 104 performs burst modulation on a signal output from an analog front-end circuit (hereinafter, referred to as an AFE) 103.

A burst-modulation-circuit write request signal 105 is output from the burst modulation circuit 104. The write request signal 105 and a burst-modulation image signal 106 are output to a dynamic random access memory (DRAM) interface circuit 135.

A synchronizing signal generation circuit (hereinafter, referred to as an SSG) 107 controls operation timings of the entire image pickup apparatus according to this embodiment. More specifically, a synchronizing signal 140 generated by the SSG 107 is input to the image sensor 102, the AFE 103, the burst modulation circuit 104, an AF-evaluation-frame generation circuit 110, a camera-signal processing circuit 120, and a resize processing circuit 125. In addition, the synchronizing signal 140 generated by the SSG 107 is also input to a recording-image processing circuit 130, an image superimposition circuit 133, a burst demodulation circuit 134, and a display unit 142. Each of the circuits determines an operation timing with reference to the synchronizing signal 140 generated by the SSG 107.

A face-image detection circuit 108 detects from the burst-modulation image signal 106 an area in which the face of a human being exists. The AF-evaluation-frame generation circuit 110 sets an area for which an AF evaluation value is calculated based on face data 109, which indicates the position and size of the face detected by the face-image detection circuit 108. An AF control circuit 111 obtains an AF evaluation value for the area, set by the AF-evaluation-frame generation circuit 110, of the burst-modulation image signal 106.

A gyroscope sensor 112 detects an angular velocity of the image pickup apparatus. An electronic image-stabilization control circuit 113 calculates a cut-out position of an image on the basis of an output from the gyroscope sensor 112. An address indicating a cut-out position of an image signal is written in a cut-out address control signal 114. The cut-out address control signal 114 is output from the electronic image-stabilization control circuit 113 and is input to the DRAM interface circuit 135. Electronic image-stabilization cut-out-position data 115 indicates a cut-out area of an image signal. Similarly to the cut-out address control signal 114, the electronic image-stabilization cut-out-position data 115 indicates the cut-out position of the image.

A resize magnification data 117 is output from a resize-magnification setting circuit 116. The resize magnification data 117 is data for setting a reduction ratio of an image in the case of resize processing in accordance with an image recording format for a recording medium 141.

A face-detection-frame display control circuit 118 calculates the position and size of a face-detection frame in accordance with the face data 109, the electronic image-stabilization cut-out-position data 115, and the resize magnification data 117 received. Face-detection-frame data 119 indicates the position and size of the face-detection frame calculated by the face-detection-frame display control circuit 118.

The camera-signal processing circuit 120 receives a camera-signal-processing input image signal 121 from the DRAM interface circuit 135. In addition, the camera-signal processing circuit 120 outputs a camera-signal-processing input request signal 122, a camera-signal-processing output request signal 123, and a camera-signal-processing output image signal 124 to the DRAM interface circuit 135.

The resize processing circuit 125 receives a resize-processing input image signal 126 from the DRAM interface circuit 135. In addition, the resize processing circuit 125 outputs a resize-processing input request signal 127, a resize-processing output request signal 128, and a resize-processing output image signal 129 to the DRAM interface circuit 135.

The recording-image processing circuit 130 generates a recording image signal by performing well-known encoding and compression for recording for a display-recording image signal 131. The image superimposition circuit 133 combines the face-detection frame generated based on the face-detection-frame data 119 with the display-recording image signal 131. The burst demodulation circuit 134 converts the image signal combined with the face-detection frame by the image superimposition circuit 133 into a display image signal.

The DRAM interface circuit 135 controls the entire image processing to be performed by the image pickup apparatus according to this embodiment. The DRAM interface circuit 135 receives request signals from the burst modulation circuit 104, the camera-signal processing circuit 120, the resize processing circuit 125, and the recording-image processing circuit 130. Then, in accordance with a memory map shown in FIG. 6 contained in a DRAM 139 and the request signals, the DRAM interface circuit 135 intervenes in the control of a DRAM address bus 136, a DRAM write data bus 137, and a DRAM read data bus 138. The intervention operation will be described with reference to FIGS. 2, 3A, and 3B.

The recording medium 141 is, for example, a magnetic tape, a magnetic disc, a digital versatile disc (DVD), a hard disk, or a semiconductor memory for recording a captured image for recording a captured image. The display unit 142 includes an organic electroluminescent display (EL) or an LCD for displaying a captured image.

Figure 5:
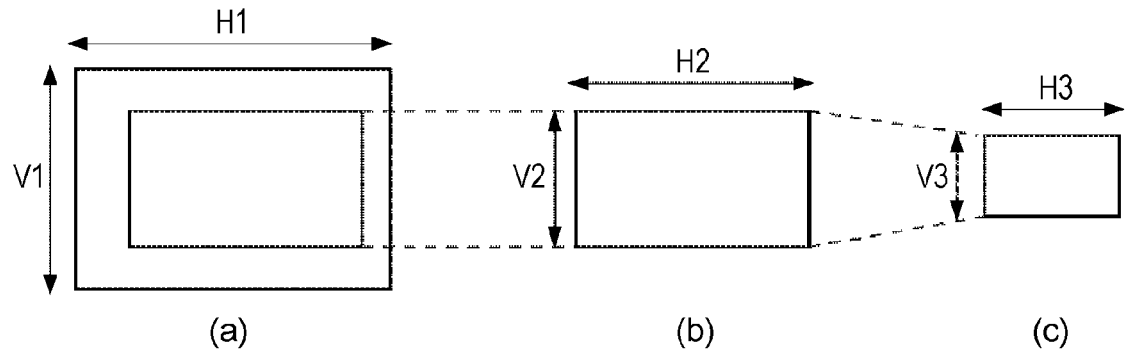
FIG. 5 includes illustrations for explaining the size of an image signal used in the first or second embodiment of the present invention.
Figure 6:
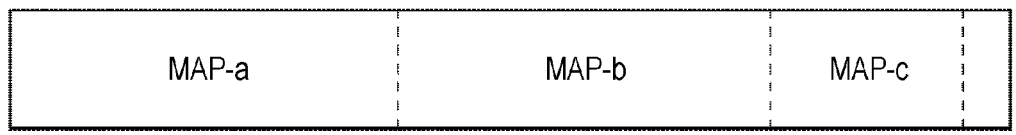
FIG. 6 is an illustration for explaining a memory map of the DRAM according to the first or second embodiment of the present invention.
Figure 7:
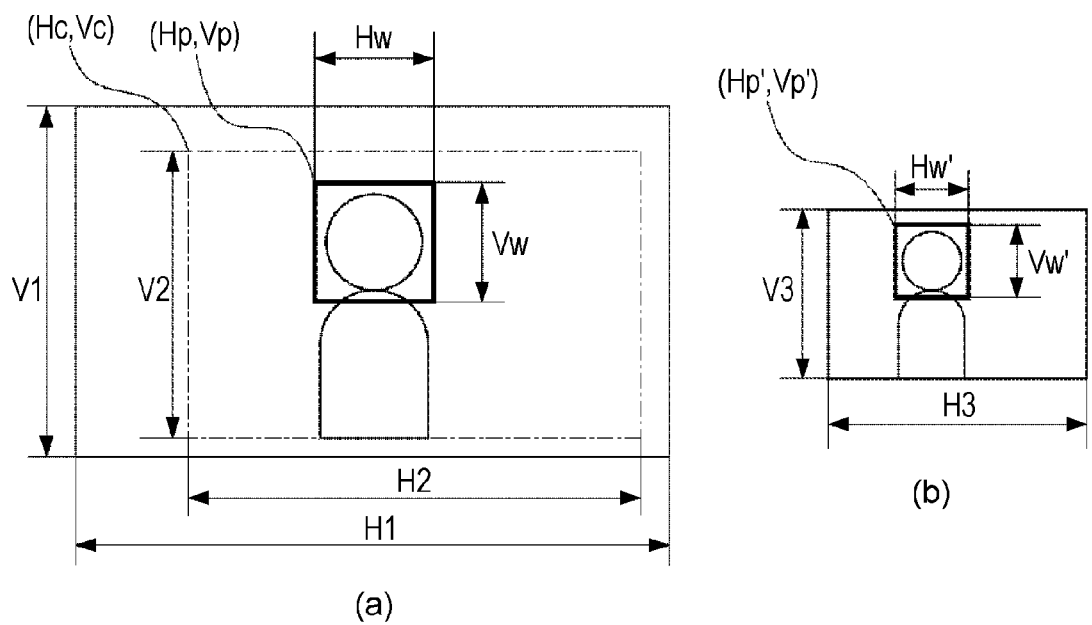
FIG. 7 includes illustrations for explaining the position and size of a face and a cut-out area for electronic image-stabilization in the first or second embodiment of the present invention.

FIG. 2 is a timing chart of an operation of the burst modulation circuit 104 according to this embodiment. FIGS. 3A and 3B are timing charts for explaining a method for intervening in the access to the DRAM 139 in this embodiment. FIG. 3A is a timing chart along a horizontal synchronization timing and FIG. 3B is a timing chart along a vertical synchronization timing. FIG. 4 is a timing chart of an operation of the burst demodulation circuit 134 according to this embodiment. FIG. 5 includes illustrations for explaining the size of an image signal used in this embodiment. FIG. 6 is an illustration for explaining the memory map of the DRAM 139. FIG. 7 includes illustrations for explaining the position and size of a face and a cut-out area for electronic image-stabilization in this embodiment.

An operation of the burst modulation circuit 104 will be described with reference to FIG. 2. An operation clock CLK1 of the image sensor 102 and the AFE 103 and an internal clock CLK2 of the burst modulation circuit 104 are shown in FIG. 2.

An image signal synchronized with the operation clock CLK1 is synchronized with the internal clock CLK2 in the burst modulation circuit 104. The frequency of the internal clock CLK2 is set to be several to a dozen times (four times, in the example shown in FIG. 2) as large as the frequency of the operation clock CLK1 of the image sensor 102 and the AFE 103. The burst modulation circuit 104 modulates an image signal in one horizontal synchronization cycle into several burst-like image signals. Thus, intervention of the DRAM write data bus 137 and the DRAM read data bus 138 can be performed in a time-sharing manner.

Referring to FIG. 3A, in one horizontal synchronization cycle Th, T1 represents a period in which the burst-modulation image signal 106, which is an output from the burst modulation circuit 104, occupies the DRAM address bus 136 and the DRAM write data bus 137. In addition, T2 represents a period in which the camera-signal-processing input image signal 121 and the camera-signal-processing output image signal 124, which are an input to and an output from the camera-signal processing circuit 120, occupy the DRAM address bus 136, the DRAM write data bus 137, and the DRAM read data bus 138. In addition, T3 represents a period in which the resize-processing input image signal 126 and the resize-processing output image signal 129, which are an input to and output from the resize processing circuit 125, occupy the DRAM address bus 136, the DRAM write data bus 137, and the DRAM read data bus 138. In addition, T4 represents a period in which the display-recording image signal 131, which is an input to the recording-image processing circuit 130, occupies the DRAM address bus 136 and the DRAM read data bus 138.

As shown in FIG. 3A, in one horizontal synchronization cycle Th, image signal processing for one horizontal synchronization cycle for the entire video camera apparatus is performed while allocation of DRAM bus access is performed in a time-sharing manner in the order of T1, T2, T3, and T4 in three batches.

As shown in FIG. 3B, in one vertical synchronization cycle Tv, writing and reading of signals are performed with a delay on a field-by-field basis or a frame-by-frame basis. More specifically, writing of the burst-modulation image signal 106, the camera-signal-processing output image signal 124, and the resize-processing output image signal 129 and reading of the display-recording image signal 131 are performed with a delay on a field-by-field basis or a frame-by-frame basis.

Operations of the units in this embodiment will be sequentially described with reference to FIG. 1.

An object image passing through the imaging optical system 101 including the focus lens reaches the image sensor 102. The image sensor 102 performs photoelectric conversion of the object image to obtain an image signal. The image signal obtained by the image sensor 102 contains H1 pixels in the horizontal direction and V1 pixels in the vertical direction as shown in part (a) of FIG. 5. The AFE 103 converts the obtained image signal into a digital image signal.

The burst modulation circuit 104 outputs the burst-modulation image signal 106 and the write request signal 105, and the output burst-modulation image signal 106 and the output write request signal 105 are input to the DRAM interface circuit 135. The DRAM interface circuit 135 controls the DRAM address bus 136 and the DRAM write data bus 137 to write the burst-modulation image signal 106 to a first memory area MAP-a of the DRAM 139 shown in FIG. 6. The number of pixels of the burst-modulation image signal 106 is the same as that of the image signal obtained by the image sensor 102 shown in part (a) of FIG. 5.

The gyroscope sensor 112 detects acceleration information indicating acceleration that is physically applied to the image pickup apparatus, and supplies the detected acceleration information to the electronic image-stabilization control circuit 113. Based on the received acceleration information, the electronic image-stabilization control circuit 113 sets the cut-out position of the image signal so as to cancel out an image shake, and outputs information on the cut-out position as the cut-out address control signal 114 and the electronic image-stabilization cut-out-position data 115.

The camera-signal processing circuit 120 outputs the camera-signal-processing input request signal 122 to the DRAM interface circuit 135 in accordance with the synchronizing signal 140. Then, the DRAM interface circuit 135 outputs the DRAM address bus 136 in accordance with the cut-out address control signal 114, and reads the DRAM read data bus 138 from the first memory area MAP-a of the DRAM 139. Then, the DRAM interface circuit 135 outputs the camera-signal-processing input image signal 121.

Instead of reading all the pixels from the first memory area MAP-a shown in FIG. 6, only an area including H2 pixels in the horizontal direction and V2 pixels in the vertical direction are cut out from the first memory area MAP-a, as shown in part (b) of FIG. 5. The values H2 and V2 are smaller than the values H1 and V1, respectively. The field angle of an image of the camera-signal-processing input image signal 121 is narrower than the field angle of an image obtained by the image sensor 102.

Thus, the camera-signal-processing input image signal 121 serves as an image signal representing an image of the cut-out area determined by the electronic image-stabilization control circuit 113.

The camera-signal processing circuit 120 performs image processing, such as color separation, gamma correction, white balance control, and outline correction, for the received camera-signal-processing input image signal 121. Then, the camera-signal processing circuit 120 outputs the camera-signal-processing output image signal 124 to the DRAM interface circuit 135. In addition, the camera-signal processing circuit 120 outputs the camera-signal-processing output request signal 123 to the DRAM interface circuit 135.

The DRAM interface circuit 135 controls the DRAM address bus 136 and the DRAM write data bus 137 to write the camera-signal-processing output image signal 124 to a second memory area MAP-b of the DRAM 139 shown in FIG. 6. The field angle of an image of the camera-signal-processing output image signal 124 is the same as the field angle of an image of the camera-signal-processing input image signal 121 shown in part (b) of FIG. 5.

The resize processing circuit 125 outputs the resize-processing input request signal 127 to the DRAM interface circuit 135 in accordance with the synchronizing signal 140. The DRAM interface circuit 135 controls the DRAM address bus 136 to read the DRAM read data bus 138 from the second memory area MAP-b of the DRAM 139 shown in FIG. 6 and to output the resize-processing input image signal 126. Similarly to the camera-signal-processing output image signal 124 shown in part (b) of FIG. 5, the resize-processing input image signal 126 represents an image including H2 pixels in the horizontal direction and V2 pixels in the vertical direction.

The resize processing circuit 125 performs resize processing of the received resize-processing input image signal 126 based on the resize magnification data 117 output from the resize-magnification setting circuit 116 in accordance with a well-known algorithm. The resize-processing output image signal 129 obtained by the resize processing includes H3 pixels in the horizontal direction and V3 pixels in the vertical direction, as shown in part (c) of FIG. 5. The values H3 and V3 are smaller than the values H2 and V2, respectively. The resize processing is performed to achieve an image recording format for the recording medium 141. Although the number of pixels of the resize-processing output image signal 129 is different from the number of pixels of the resize-processing input image signal 126, the field angle of the resize-processing output image signal 129 is the same as the field angle of the resize-processing input image signal 126.

The resize processing circuit 125 outputs the resize-processing output image signal 129 and the resize-processing output request signal 128 to the DRAM interface circuit 135. Based on the resize-processing output image signal 129, recording and display image signals are generated. In this embodiment, a display image is generated using the electronic image-stabilization control circuit 113, the resize-magnification setting circuit 116, the camera-signal processing circuit 120, the resize processing circuit 125, the DRAM interface circuit 135, and the DRAM 139.

The DRAM interface circuit 135 controls the DRAM address bus 136 and the DRAM write data bus 137 to write the resize-processing output image signal 129 to a third memory area MAP-c of the DRAM 139 shown in FIG. 6.

The recording-image processing circuit 130 outputs a display-recording-image request signal 132 to the DRAM interface circuit 135 in accordance with the synchronizing signal 140. The DRAM interface circuit 135 controls the DRAM address bus 136 to read the DRAM read data bus 138 from the third memory area MAP-c of the DRAM 139 shown in FIG. 6 and to output the display-recording image signal 131. The number of pixels and the field angle of the resize-processing output image signal 129 are the same as the number of pixels and the field angle of the display-recording image signal 131. The display-recording image signal 131 is output as a recording image and a display image to the recording-image processing circuit 130 and the image superimposition circuit 133, respectively. The recording-image processing circuit 130 performs well-known encoding and compression for recording for the display-recording image signal 131 to generate a recording image signal, and records the generated recording image signal in the recording medium 141.

The face-image detection circuit 108 detects a face existing in an image in accordance with a well-known method for performing comparison and matching of template data of a face image stored in advance in a memory (not shown) and the burst-modulation image signal 106. Although the face-image detection circuit 108 is explained as an example in this embodiment, the face-image detection circuit 108 is not necessarily used. A face is not necessarily detected as a target. A particular individual or an animal, such as a dog or a cat, may be detected as a target as long as a detection circuit has a function of detecting an object which satisfies a certain condition and is located within the coordinates of an image.

The face-image detection circuit 108 generates and outputs the face data 109 indicating the position and size of a face in the burst-modulation image signal 106.

The AF-evaluation-frame generation circuit 110 generates an AF-evaluation-frame signal based on the synchronizing signal 140 and the face data 109, and supplies the generated AF-evaluation-frame signal to the AF control circuit 111. The AF control circuit 111 extracts an image of a predetermined spatial frequency component from the received burst-modulation image signal 106. In addition, the AF control circuit 111 extracts an image of a spatial frequency component corresponding to an area in which the face exists in the burst-modulation image signal 106 by referring to the AF-evaluation-frame signal generated by the AF-evaluation-frame generation circuit 110 and generates an AF-control evaluation value. With reference to the generated AF-control evaluation value, automatic focus adjustment is performed by adjusting the position of the focus lens of the imaging optical system 101 in accordance with a well-known method. Accordingly, AF control focused on the face of an object can be achieved.

The face-detection-frame display control circuit 118 calculates, using equations (1) to (4), the position and size of the face included in the display-recording image signal 131 in accordance with the face data 109, the electronic image-stabilization cut-out-position data 115, and the resize magnification data 117, and outputs information on the calculated position and size as the face-detection-frame data 119.

$$Hp' = (Hp - Hc) * H3/H2 \quad (1)$$

$$Vp' = (Vp - Vc) * V3/V2 \quad (2)$$

$$Hw' = Hw * H3/H2 \quad (3)$$

$$Vw' = Vw * V3/V2 \quad (4)$$

In equations (1) to (4), "Hc" represents the cut-out position in the horizontal direction obtained from the electronic image-stabilization cut-out-position data 115, and "Vc" represents the cut-out position in the vertical direction obtained from the electronic image-stabilization cut-out-position data 115. In addition, "Hp" represents the position of the face in the horizontal direction obtained from the face data 109, and "Vp" represents the position of the face in the vertical direction obtained from the face data 109. In addition, "Hw" represents the size of the face in the horizontal direction obtained from the face data 109, and "Vw" represents the size of the face in the vertical direction obtained from the face data 109. In addition, "Hp'" represents the position of the face-detection frame in the horizontal direction obtained from the face-detection-frame data 119, and "Vp'" represents the position of the face-detection frame in the vertical direction obtained from the face-detection-frame data 119. In addition, "Hw'" represents the size of the face-detection frame in the horizontal direction obtained from the face-detection-frame data 119, and "Vw'" represents the size of the face-detection frame in the vertical direction obtained from the face-detection-frame data 119.

As shown in equations (1) to (4), regarding information on the position and size of the face contained in the face data 109, the face-detection-frame display control circuit 118 adjusts the position with respect to the field angle of an image that has been subjected to cut-out processing based on the electronic image-stabilization cut-out-position data 115. More specifically, the position of the face contained in the face data 109 is shifted by the amount corresponding to the cut-out position based on the electronic image-stabilization cut-out-position data 115. Then, conversion regarding changes (H3/H2 and V3/V2) in image sizes obtained from the resize magnification data 117 is performed. Thus, the face-detection-frame data 119 output from the face-detection-frame display control circuit 118 reflects a change in the field angle generated by image cutout due to electronic image-stabilization and a change in the size of an area of the face due to resize processing.

The face-detection-frame data 119 outputs from the face-detection-frame display control circuit 118 is supplied to the image superimposition circuit 133. As shown in FIG. 7(*b*), a face-detection frame generated on the basis of the face-detection-frame data 119 is combined with the display-recording image signal 131 received as a display image. Then, as shown in FIG. 4, the burst demodulation circuit 134 converts the internal clock CLK2 into a display image signal that is synchronized with a clock CLK3 corresponding to a video signal specification. Then, a captured image on which the face-detection frame is superimposed is displayed on the display unit 142 by using the converted display image signal.

Consequently, with respect to the position of the face detected by the face-image detection circuit 108, a user of the image pickup apparatus is able to visually recognize an image on which a face-detection frame is superimposed, and AF control can be performed for an area in which the face detected by the face-image detection circuit 108 exists.

As described above, according to this embodiment, even in a case where a difference between the field angle of an image output from the image pickup element and the field angle of an image displayed on the display unit is caused by the electronic image-stabilization function provided in the image pickup apparatus, a frame indicating the detected position of an object can be displayed so as to be superimposed on the object. Furthermore, since the object is detected from an image that has not been subjected to electronic image-stabilization, a time lag occurring when the object is detected can be reduced. Thus, an image pickup apparatus having excellent object-tracking characteristics can be provided.

Second Embodiment

Figure 8:
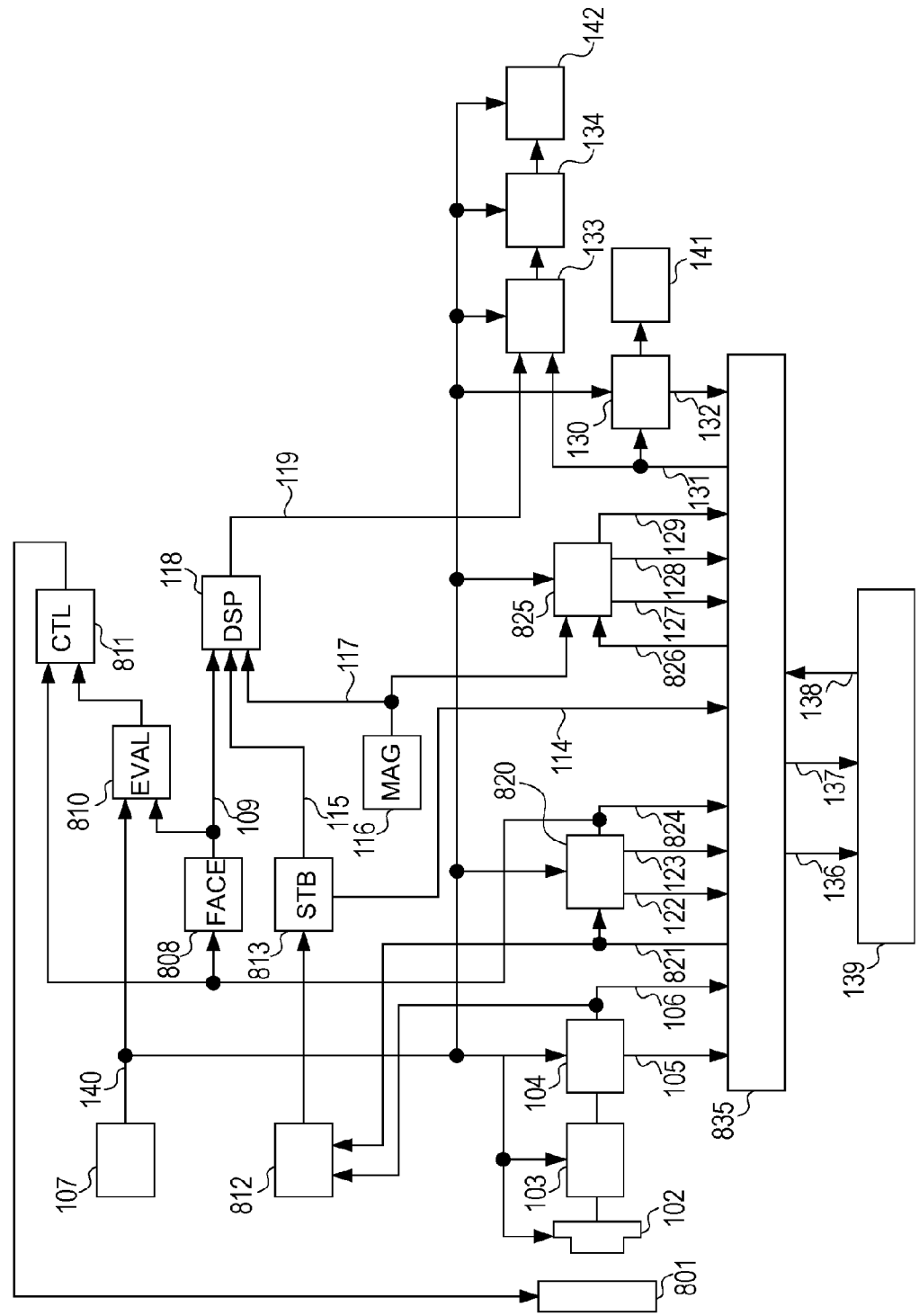
FIG. 8 is a block diagram showing the entire configuration of an image pickup apparatus according to the second embodiment of the present invention.

FIG. 8 is a block diagram showing an image pickup apparatus according to a second embodiment of the present invention.

The second embodiment is different from the first embodiment in that a cut-out position for electronic image-stabilization is calculated based on motion vector information. In FIG. 8, component parts having operations different from those of corresponding component parts shown in FIG. 1 are denoted by reference numerals different from those shown in FIG. 1 and component parts having operations the same as those of corresponding component parts shown in FIG. 1 are denoted by reference numerals the same as those shown in FIG. 1. In this embodiment, component parts having operations different from those of corresponding component parts in the first embodiment will be mainly described.

Referring to FIG. 8, an imaging optical system 801 includes an optical aperture. A face-image detection circuit 808 detects an area in which the face of a human being exists from a camera-signal-processing output image signal 824, which is a signal output from a camera-signal processing circuit 820. An AE-evaluation-frame generation circuit 810 sets an area for which an AE evaluation value is calculated based on the face data 109, which indicates the position and size of the face detected by the face-image detection circuit 808. An AE control circuit 810 obtains an AE evaluation value for the area, set by the AE-evaluation-frame generation circuit 810, of the camera-signal-processing output image signal 824.

A motion-vector detection circuit 812 detects motion of a field angle by comparing the burst-modulation image signal 106 output from the burst modulation circuit 104 with the camera-signal-processing output image signal 824 output from the camera-signal processing circuit 820. An electronic image-stabilization control circuit 813 calculates the cut-out position of an image based on an output from the motion-vector detection circuit 812.

The camera-signal processing circuit 820 receives a camera-signal-processing input image signal 821 from a DRAM interface circuit 835. The camera-signal processing circuit 820 also outputs the camera-signal-processing input request signal 122, the camera-signal-processing output request signal 123, and the camera-signal-processing output image signal 824 to the DRAM interface circuit 135. The camera-signal-processing output image signal 824 is generated by performing image processing, such as color separation, gamma correction, white balance control, and outline correction, for the received camera-signal-processing input image signal 821.

A resize processing circuit 825 receives a resize-processing input image signal 826 from the DRAM interface circuit 835. The resize processing circuit 825 also outputs the resize-processing input request signal 127, the resize-processing output request signal 128, and the resize-processing output image signal 129 to the DRAM interface circuit 135.

The DRAM interface circuit 835 controls the entire image processing to be performed by the image pickup apparatus according to this embodiment.

In this embodiment, as shown in FIG. 3A, with respect to one vertical synchronization cycle Tv, writing and reading of signals are performed with a delay on a field-by-field basis or a frame-by-frame basis. More specifically, writing of the burst-modulation image signal 106, the camera-signal-processing output image signal 824, and the resize-processing output image signal 129 and reading of the display-recording image signal 131 are sequentially performed with a delay on a field-by-field basis or a frame-by-frame basis.

Operations of the units of the image pickup apparatus according to this embodiment will be described with reference to FIG. 8 while focusing on differences from the first embodiment.

In the first embodiment, the DRAM interface circuit 135 outputs the DRAM address bus 136 based on the cut-out address control signal 114 generated in accordance with acceleration information obtained by the gyroscope sensor 112. Then, the DRAM read data bus 138 is read from the first memory area MAP-a of the DRAM 139, and the read DRAM read data bus 138 is input as the camera-signal-processing input image signal 121 to the camera-signal processing circuit 120. That is, the camera-signal-processing input image signal 121 input to the camera-signal processing circuit 120 is an image signal that has been subjected to cut-out processing for electronic image-stabilization, and the field angle of the camera-signal-processing input image signal 121 is narrower than the field angle of an image signal obtained by the image sensor 102.

The second embodiment is different from the first embodiment in that the camera-signal-processing input image signal 821 read from the first memory area MAP-a of the DRAM 139 and input to the camera-signal processing circuit 820 is an image signal that has not been subjected to cut-out processing for electronic image-stabilization. The motion-vector detection circuit 812 detects motion of the field angle by using the camera-signal-processing input image signal 821 and the burst-modulation image signal 106. Although the image size of the burst-modulation image signal 106 is the same as that of the camera-signal-processing input image signal 821, there is a delay difference of one vertical synchronization cycle, as described above. Thus, by comparing the camera-signal-processing input image signal 821 with the burst-modulation image signal 106, a motion vector of a field angle can be calculated in accordance with a known method. The motion vector information calculated as described above is supplied to the electronic image-stabilization control circuit 813. The electronic image-stabilization control circuit 813 sets the cut-out position so as to cancel out an image shake based on the motion vector information, and outputs information on the cut-out position as the cut-out address control signal 114 and the electronic image-stabilization cut-out-position data 115. As described above, although an image signal that has been subjected to cut-out processing for electronic image-stabilization is input to the camera-signal processing circuit 120 in the first embodiment, an image signal that has not been subjected to cut-out processing for electronic image-stabilization is also input to the camera-signal processing circuit 820 in this embodiment.

The DRAM interface circuit 135 cuts out an image signal including H2 pixels in the horizontal direction and V2 pixels in the vertical direction from the camera-signal-processing output image signal 824 written in the second memory area MAP-b of the DRAM 139 shown in FIG. 6 in accordance with the cut-out address control signal 114. The cut-out image signal is input as the resize-processing input image signal 826 to the resize processing circuit 825.

Since the cut-out area set by the electronic image-stabilization control circuit 813 is an area for canceling out an image shake calculated by the motion-vector detection circuit 812, the resize-processing input image signal 826 serves as an image signal for canceling out the influence of an image shake occurring in the image pickup apparatus. The resize processing circuit 825 performs resize processing, in accordance with a well-known algorithm, for the received resize-processing input image signal 826 based on the resize magnification data 117 output from the resize-magnification setting circuit 116. Then, the resize processing circuit 825 outputs the resize-processing output image signal 129, and processing as in the first embodiment is performed.

The face-image detection circuit 808 detects a face existing in an image in accordance with a well-known method for performing comparison and matching of template data of a face image stored in advance in a memory (not shown) with the camera-signal-processing output image signal 824. The face-image detection circuit 808 generates and outputs the face data 109 indicating the position and size of the face contained in the camera-signal-processing output image signal 824.

The AE-evaluation-frame generation circuit 810 generates an AE-evaluation-frame signal based on the synchronizing signal 140 and the face data 109, and supplies the generated AE-evaluation-frame signal to an AE control circuit 811. The AE control circuit 811 extracts brightness corresponding to an area in which the face exists in the received camera-signal-processing output image signal 824 with reference to the AE-evaluation frame signal, and generates an AE-control evaluation value. With reference to the generated AE-control evaluation value, automatic exposure control is performed by adjusting an aperture state of the imaging optical system 801 in accordance with a well-known method. Thus, AE control focused on the face of an object can be achieved. Although a configuration in which at least one of automatic focus control and exposure control is performed has been described in each of the first embodiment and the second embodiment, both automatic focus control and exposure control may be performed.

As in the first embodiment, the face-detection-frame display control circuit 118 calculates, using equations (1) to (4), the face-detection-frame data 119 in accordance with the face data 109, the electronic image-stabilization cut-out-position data 115, and the resize magnification data 117.

As in the first embodiment, regarding information on the position and size of the face contained in the face data 109, the face-detection-frame display control circuit 118 adjusts the position with respect to the field angle of an image that has been subjected to cut-out processing based on the electronic image-stabilization cut-out-position data 115. More specifically, the position of the face contained in the face data 109 is shifted by the amount corresponding to the cut-out position based on the electronic image-stabilization cut-out-position data 115. Then, conversion regarding changes (H3/H2 and V3/V2) in image sizes obtained from the resize magnification data 117 is performed.

Thus, the face-detection-frame data 119 output from the face-detection-frame display control circuit 118 reflects a change in the field angle generated by image cutout due to electronic image-stabilization and a change in the size of an area of the face due to resize processing.

Then, as in the first embodiment, an image on which a face-detection frame is superimposed is displayed on the display unit 142 by using the converted image signal.

As described above, in the second embodiment, even in a case where a difference between the field angle of an image output from the image pickup element and the field angle of an image displayed on the display unit is caused by the electronic image-stabilization function provided in the image pickup apparatus, a frame indicating the detected position of an object can be displayed so as to be superimposed on the object. Furthermore, since the object is detected from an image that has not been subjected to electronic image-stabilization, a time lag occurring when the object is detected can be reduced. Thus, an image pickup apparatus having excellent object-tracking characteristics can be provided.

Although specific embodiments of the present invention have been described, an aspect of the present invention may be implemented by any other forms, such as an apparatus, a method, a program, or a storage medium (recording medium). More specifically, an aspect of the present invention may be applied to a configuration constituted by a plurality of apparatuses or a configuration constituted by a single apparatus. As an example of the configuration constituted by a plurality of apparatuses, a configuration including an image input apparatus and an image processing apparatus that are combined or connected together is available. An image input apparatus is not necessarily a video camera. For example, a camera, such as a digital camera or a surveillance camera, utilizing an image pickup element, such as a CCD sensor or a CMOS sensor, may be used as an image input apparatus. In addition, for example, a personal computer may be used as an image processing apparatus. In such a system, a case where the functions of the above-described embodiments are attained when the CPUs or the like contained in all or some of the apparatuses constituting the system perform part or all of the actual processing also falls within the scope of the present invention.

In addition, an aspect of the present invention can also be attained when software programs implementing the functions of the above-described embodiments are supplied to the apparatus directly or via remote control and a computer of the apparatus reads and executes supplied program code.

Thus, program code itself installed into the computer in order to implement functional processing of an aspect of the present invention also implements the aspect of the present invention. That is, a computer program itself for attaining functional processing of an aspect of the present invention also falls within the scope of the present invention.

In this case, the computer program may be of any type, such as an object code, a program to be executed by an interpreter, or script data to be supplied to an operating system (OS), as long as it has a function of a program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2007-172745 filed Jun. 29, 2007, which is hereby incorporated by reference herein in its entirety.

What is claimed is:

1. An image processing apparatus comprising:
   an image stabilization control unit configured to detect an image shake component generated in a shooting operation, and to set a cut-out position of an image so as to cancel out the image shake component;
   a generation unit configured to perform cut-out processing using the cut-out position and resize processing for the image to generate a display image;
   a detection unit configured to detect an area of the image that has not been subjected to the cut-out processing and resize processing by the generation unit, the area containing a human being, and to generate information on a position of the detected area;
   an adjusting unit configured to adjust the information on the position of the detected area in accordance with the cut-out position and a magnification of the resize processing; and
   a display unit configured to display an indication indicating a position of the human being with the display image, based on the information on the position of the detected area after the adjustment is performed.

2. The image processing apparatus according to claim 1, wherein the image stabilization control unit set the cut-out position in accordance with a motion vector detected from the image.

3. The image processing apparatus according to claim 1, further comprising an image pickup element,
   wherein the image stabilization control unit includes a gyroscope configured to detect an acceleration of movement of the image processing apparatus.

4. The image processing apparatus according to claim 1, further comprising an image pickup element,
   wherein at least one of automatic focus control and exposure control is performed by using the information on the position of the area detected by the detection unit.

5. A method for image processing, the method comprising:
   detecting an image shake component generated in a shooting operation, and setting a cut-out position of an image so as to cancel out the image shake component;
   performing cut-out processing using the cut-out position and resize processing for the image to generate a display image;
   detecting an area of the image that has not been subjected to the cut-out processing and resize processing, the area containing a human being, and generating information on a position of the detected area;
   adjusting the information on the position of the detected area in accordance with the cut-out position and a magnification of the resize processing; and
   displaying an indication indicating a position of the human being with the display image, based on the information on the position of the detected area after the adjustment is performed.

* * * * *